(12) United States Patent
Iellimo

(10) Patent No.: US 12,384,626 B2
(45) Date of Patent: Aug. 12, 2025

(54) PALLET STORAGE AND FLOW SYSTEM AND METHOD

(71) Applicant: FRAZIER INDUSTRIAL COMPANY, Long Valley, NJ (US)

(72) Inventor: Domenick Iellimo, Forked River, NJ (US)

(73) Assignee: FRAZIER INDUSTRIAL COMPANY, Long Valley, NJ (US)

( * ) Notice: Subject to any disclaimer, the term of this patent is extended or adjusted under 35 U.S.C. 154(b) by 835 days.

(21) Appl. No.: 17/674,222

(22) Filed: Feb. 17, 2022

(65) Prior Publication Data

US 2023/0257200 A1  Aug. 17, 2023

(51) Int. Cl.
| | | |
|---|---|---|
| B65G 1/137 | (2006.01) | |
| B65G 1/02 | (2006.01) | |
| B65G 1/06 | (2006.01) | |
| B65G 1/08 | (2006.01) | |

(52) U.S. Cl.
CPC .......... *B65G 1/1376* (2013.01); *B65G 1/023* (2013.01); *B65G 1/065* (2013.01); *B65G 1/08* (2013.01)

(58) Field of Classification Search
CPC .......... B65G 1/023; B65G 1/08; B65G 1/065
See application file for complete search history.

(56) References Cited

U.S. PATENT DOCUMENTS

| | | | | |
|---|---|---|---|---|
| 4,234,069 A | * | 11/1980 | Seiz | B65G 1/08 188/139 |
| 5,873,473 A | * | 2/1999 | Pater | B65G 1/06 211/183 |
| 2003/0034708 A1 | * | 2/2003 | Digby | H02K 3/528 310/194 |
| 2011/0144798 A1 | * | 6/2011 | Freudelsperger | B65G 1/08 700/218 |
| 2019/0303844 A1 | * | 10/2019 | Stevens | B65G 1/0492 |
| 2022/0017305 A1 | * | 1/2022 | Larsson | B65G 1/0471 |
| 2023/0116127 A1 | * | 4/2023 | Iellimo | B65G 1/0492 211/134 |
| 2024/0308788 A1 | * | 9/2024 | Garriott | B66F 9/18 |

FOREIGN PATENT DOCUMENTS

EP  2275362 A2 *  1/2011 ............. B65G 1/023

\* cited by examiner

*Primary Examiner* — Timothy R Waggoner
(74) *Attorney, Agent, or Firm* — Dilworth & Barrese, LLP

(57) ABSTRACT

A storage system and method wherein a storage rack has a first flat section, where pallets are loaded onto storage rails by an automated pallet transportation cart, and a second inclined flow section, where pallets are moved to the front of the storage lane by the force of gravity. A transition section can be positioned between the flat section and the inclined section. The transition section has rails and spacing for a pallet cart to load pallets onto the inclined section. As the front pallet is removed, the second pallet (and subsequent pallets on the inclined section) travels forward to take its place under the force of gravity. Therefore, no pallet cart is needed to unload the inclined section.

20 Claims, 5 Drawing Sheets

PALLET STORAGE AND FLOW SYSTEM AND METHOD

BACKGROUND

The disclosure relates to systems and methods for storing, organizing, transporting and managing pallets of goods, and more particularly, to a system and method for positioning pallets of goods at the front of a storage bay where they can be picked from by a worker, or accessed by a forklift.

Storage systems are used in warehouses, department stores, cold storage areas and other storage facilities to store pallets of goods. Certain storage systems employ extensive storage rack systems, often called deep rack storage, to store large amounts of a variety of different products. Some of these systems have columns formed of rows of storage bays stacked on top of each other, with two to seven or higher levels and no aisles between columns of storage bays. The pallets can weigh 1000, 2000 and often 3000 pounds or more. The pallets sometimes support several cartons.

Some storage systems load from the rear of a storage bay and unload from the front of the bay. Others load and unload from the front. Unloading can involve a worker picking individual products or cartons from the pallet at the front of the lane of a storage bay. Unloading can also involve removing an entire pallet. After a pallet has been picked until it is empty, or after a pallet is removed, the next pallet must be positioned in place at the front of the storage lane.

Due to the density of the storage area and the limited sight lines and access, it can be time consuming and present logistical problems to move pallets from a rearward position in a storage lane/bay, to the front of the lane. Some conventional storage systems employ automated mobile data collection and pallet transportation carts under the pallets in the storage racks and transport pallets forward and rearward within the row. These pallet carts can travel on rail systems located under the pallet storage racks. The bays can be 250 feet long, or longer and many pallets, 10, 20, 40, or more pallets deep.

A side view of a rear loading storage facility is shown generally in FIG. 1, as rack 100. A first forklift 110 is used to load pallets of goods (not shown) into a rear end 121 of a storage lane 120. Rack system 100 includes a plurality of vertical columns 131 that support a plurality of left-side and right-side pallet storage rails 132. The pallets are stored on a top surface of pallet storage rails 132. A pallet cart rail 133 is located under pallet storage rails 132. An automated pallet transportation cart can run on rails 133. Each cart includes a pallet lifting structure. When the cart is positioned under a pallet, the lifting structure will raise the pallet slightly over storage rails 132. The cart can then transport the pallet within lane 120.

In certain embodiments of the invention, a worker 140 can pick cartons or individual items from a pallet at a front location 120a, as a normal part of warehouse operation. When the pallet at front position 120a is empty, it is removed, and a pallet at second position 120b is moved forward, to first position 120a.

Many storage facilities have multiple lanes, each requiring a pallet transportation cart to bring pallets to the front of the lane. Pallet transportation carts are expensive. Therefore, some facilities shuttle the carts among the different storage lanes. However, this can be time consuming as workflow must stop as a cart is moved from one lane to another.

Accordingly, an improved system and method for storing and transporting pallets of goods that overcomes drawbacks of the prior art is desirable.

SUMMARY

Generally speaking, in accordance with the invention, a storage system and method is provided, having a first flat storage section, where pallets are stored on rails, and transported by an automated pallet transportation cart, and a second inclined flow section, where pallets are moved to the front of the storage bay lane by the force of gravity. The inclined flow section should include a transition section, for an automated pallet cart to move a pallet from the flat storage section to the inclined flow section. The flow section includes one or more pallet separators, which control the flow of pallets in the flow section by stopping the forward progress of a trailing pallet down the inclined section until the leading pallet immediately in front of the trailing pallet is removed. The transition section is constructed with adequate clearance for the pallet transportation cart. Because the pallets on the flow section move forward, one pallet at a time, on their own, without the need for a pallet cart, the need to move the pallet transportation cart from one row to another can be reduced two fold, threefold or more, depending on the pallet depth of the inclined flow section.

The inclined flow section includes a low friction surface, such as a plurality of wheels protruding through the support rails, on which the pallets can flow forward, toward the front of the lane, from the force of gravity. It is advisable to include speed controls to govern the speed at which the pallets roll forward down the inclined flow section. It is also advisable to include pallet separators to take the weight off and reduce line pressure. Clearance should be provided in the transition section to permit a pallet transportation cart to travel under the support rails of the transition section to move a pallet past the transition section to the flow section. Once the flow section is empty, a pallet transportation cart can refill the flow section by moving the pallets forward past the transition section to the flow section.

When the low friction section comprises wheels protruding through the tops of support rails, the wheels of the flow section can be positioned through slots in the pallet support rails at the outer edges of where the pallets are supported. However, the pallets can sag in their middle regions. This can interfere with forward progress of the pallet down the flow section. Support wheels can be provided on an additional flow rail, positioned inward from the pallet support rails, near the mid-point between the support rails. Positioning the support wheels inward helps eliminate any sag that may occur between the pallet support rails. However, inwardly position wheels will interfere with the movement and operation of a pallet transportation cart. Therefore, it can be advantageous to include a first, rearward transition section where the wheels (low friction portion) are spaced outward, the width of the rails, with pallet cart transportation rails underneath; and a more forward flow portion of the flow section that can include inwardly positioned flow wheels (low friction support), to prevent any sagging.

Speed controllers, advantageously included in the flow section, can be conventional centripetal force type or electromagnetic type speed controllers. controllers. The pallet separators can be of a conventional type, where the weight of a forward pallet on a control pedal raises a separator, located to be slightly behind the pallet pressing on the pedal. Then, when the front pallet is removed, the pedal is released and the pallet separator retracted, to permit the pallets to flow forward. A lip at the front of the lane acts as a stop to keep the front most pallet from rolling off the front of the lane.

It is important to provide space under the rails so that the last piece of cart rail ("transition piece") has room for the cart to drive between the rails. It can be half cart rail—half pallet flow rail.

It is also important that the pallets not become hung up on the first wheel of the flow section, which will be raised above the pallet support rails. The differential in height on the transition piece (from the "highest roller" to "lowest roller" should be compatible with the lifting and lowering capabilities of the pallet cart. The cart has to lift the pallet high enough to clear the pallet over the roller, and it has to drop down low enough in the lowered position so that the pallet rolls over top of the cart and doesn't catch on the leading edge of the cart, even if there is some central sag of the pallet.

At e.g., 7/16 inch downward slope per foot, over a 48 inch pallet length, there is 1¾ inches total drop from the high roller to the low roller. With 2 inches of lift travel, it will be possible to lift the pallet high enough to start the pallet over the top of the high roller, so that the system can maximize clearance on the low end.

Other objects, advantages and embodiments of the invention will be apparent from the specification and the drawings and the scope of the invention will be indicated in the claims.

BRIEF DESCRIPTION OF THE DRAWINGS

Throughout the specification, like reference numerals will be used to indicate similar elements. The structures are not necessarily drawn to scale.

DETAILED DESCRIPTION OF THE PREFERRED EMBODIMENTS

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
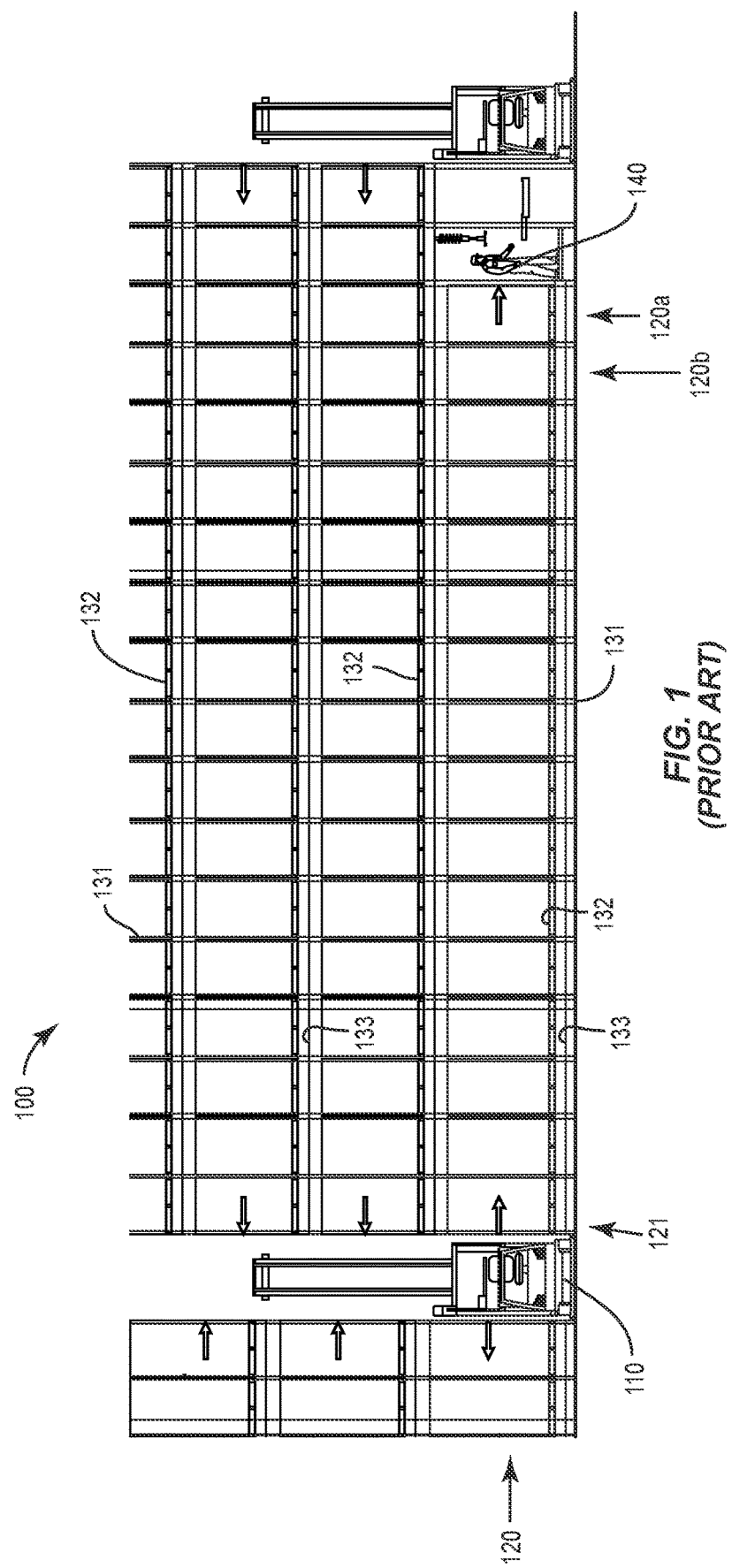
FIG. 1 is a side view of a conventional storage rack system.
Figure 3:
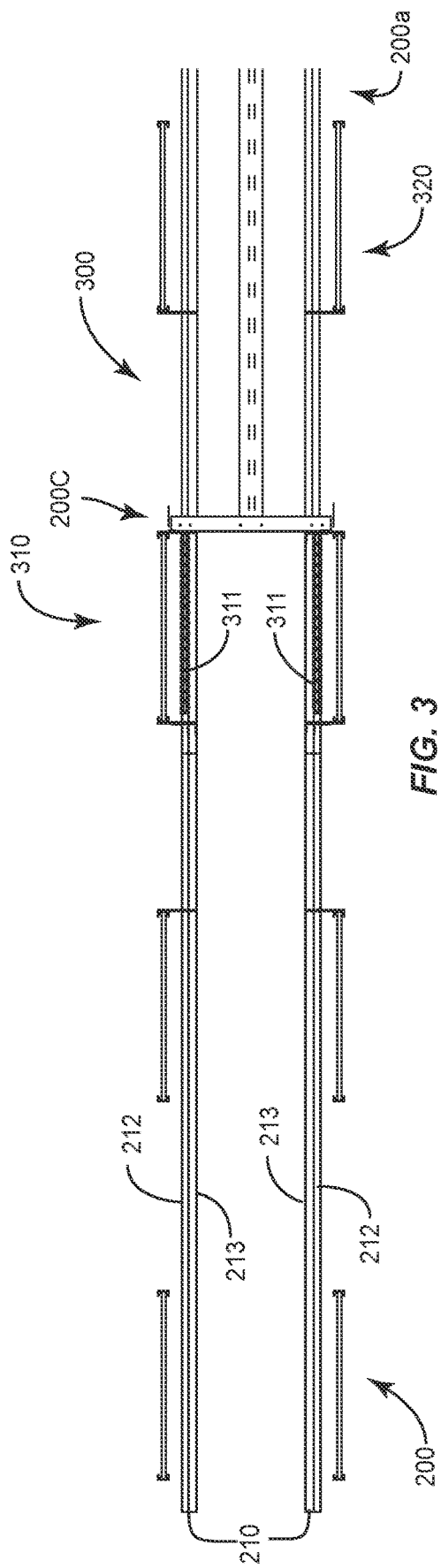
FIG. 3 is a top plan view of the pallet storage system of FIG. 2.
Figure 2:
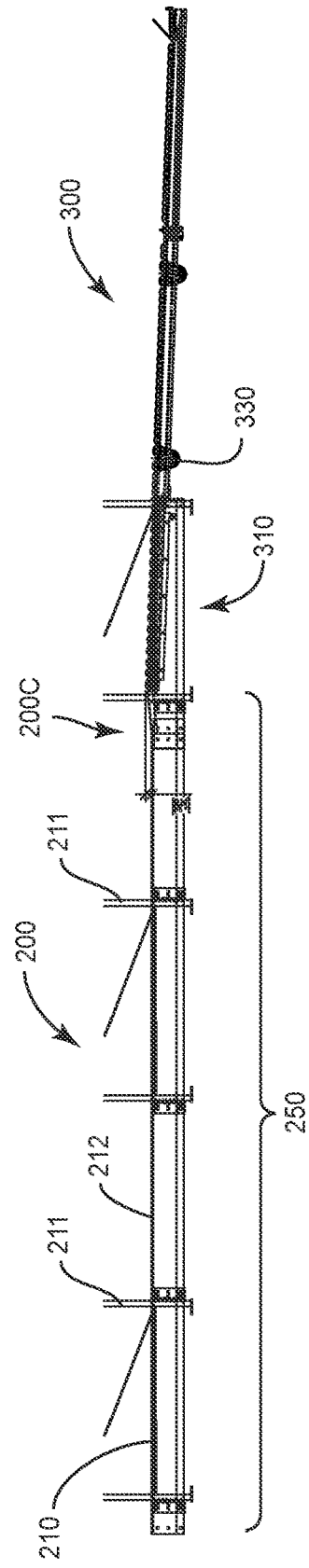
FIG. 2 is a side view of a pallet storage system in accordance with an embodiment of the invention.

A pallet storage system in accordance with a preferred embodiment of the invention is shown generally in FIGS. 2 and 3 as storage system 200. Storage system 200 has a front end 200a and a rear end 200b. Storage system 200 includes a pair of pallet support rails 210. Rails 210 are supported by a plurality of vertical columns 211. Rails 210 include a pallet support top surface 212 for supporting the pallets of goods. These pallets can weigh up to 1000, 2000, and even 3000 pounds or more. Therefore, rails 210 and vertical columns 211 must be formed of materials to be effectively strong enough to hold many pallets, which together, can weigh up to and more than 10,000 pounds.

Rails 210 also include a pallet cart rail 213. In preferred embodiments of the invention, rail 210 is formed as a general S shape, with pallet support surface 212 as the outer, top portion of the "S" and pallet cart rail 213 as the innermost, lower surface, with a vertical wall therebetween. In one embodiment of the invention, a pallet transportation cart will receive a pallet of goods and travel down cart rails 213 to a front portion of rail 210 and deposit the pallet on pallet support surface 212, then travel back on cart rails 213 to receive the next pallet to be brought forward.

Pallet storage system 200 includes a horizontal section 250, where pallets rest stationary on substantially horizontal rail 210. Horizontal storage section 250 can be 10, 20, 40 or more pallets deep.

Figure 5:
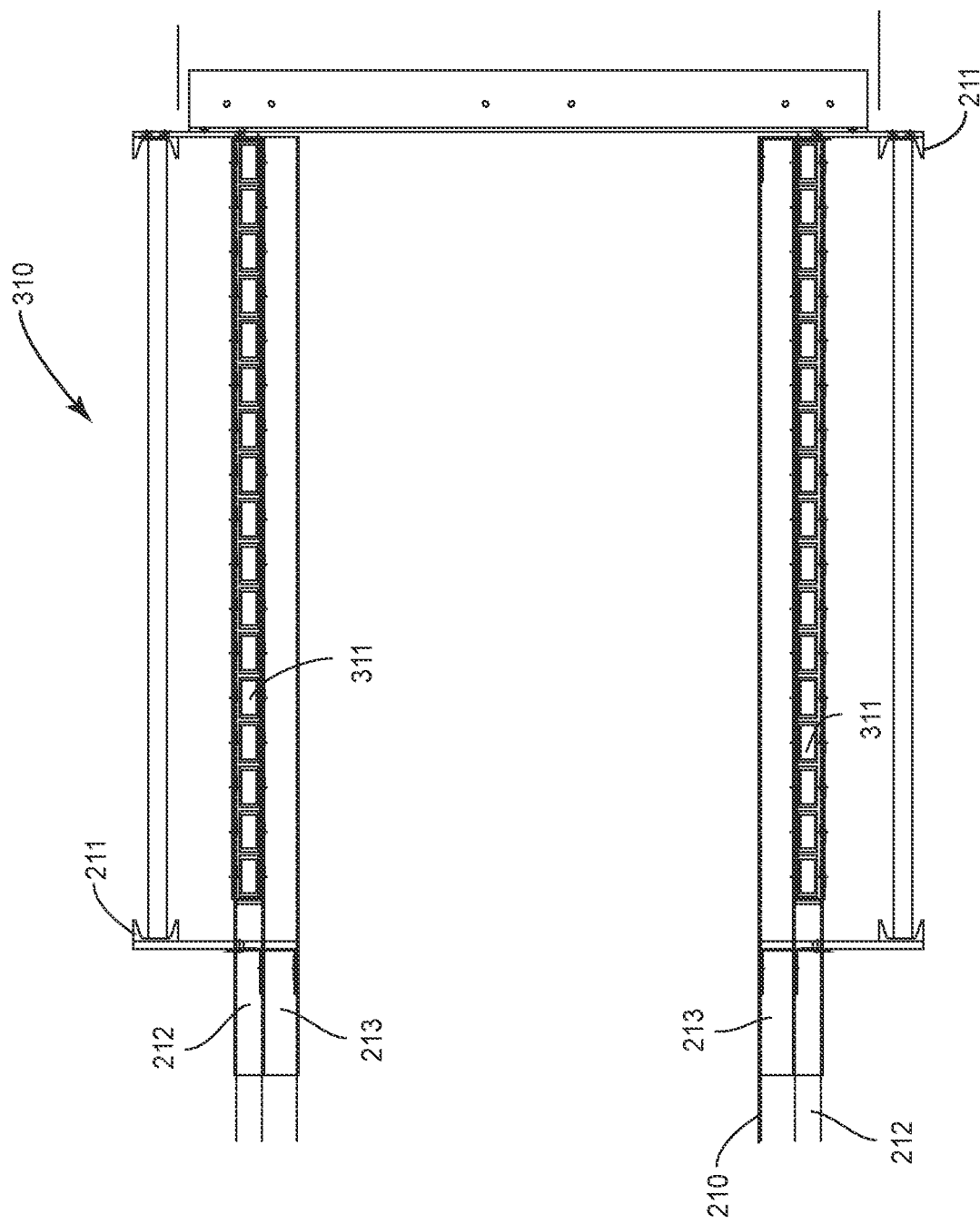
FIG. 5 is an exploded view of a portion of the pallet storage system of FIG. 3.

An active flow section 300 is shown generally extending forward, from a front location 200c of a transition section 310. Transition section 310, wherein a plurality of pallet flow wheels 311 extend through a plurality of the respective slots in pallet support rail 212. Upper section 310 is shown more clearly in FIG. 5. This wide spacing of the wheels permits a pallet cart to travel below the rails and deposit a pallet directly onto upper section 310.

Common pallet transportation cart rail spacing is about 45" to 30", preferably about 37" to 42" wide, depending on specific requirements. The rails should be formed of steel of a strength to hold sever ton or more pallets. One common cart rail spacing is about 39.5" (out to out). This is preferred with 40" face pallets. Some transportation carts can be "narrow body," such as 3" narrower. The rails can be about 36.5" (out to out). The cart itself can have a pallet lifting platform of about be about 35" to 28" wide.

A narrow cart facilitates a pallet flow rail spacing that is more common. In a "standard" pallet flow only racking design, the two outer rows of wheels/rollers are not all the way to the edges of the pallet, which helps reduce pallet sagging, so going with the narrower cart have benefits overall. In preferred embodiments of the invention, outside edge to outside edge (out to out) an the cart rails can be 33"-40" for 33"-40" face pallets, but can vary further if designing for custom sized pallets that are outside that width range.

Transition section 310 and active flow section 300 is pitched, so that pallets will travel forward on their own, under the force of gravity. The accuracy of the pitch can be important, both to ensure that the pallets roll forward, and to ensure that heavy pallets do not roll too quickly. An advantageous pitch can be more than about 4/16 inch per foot, preferably about 5/16-9/16 inches per foot, most preferably about 7/16 inch per foot.

Figure 4:
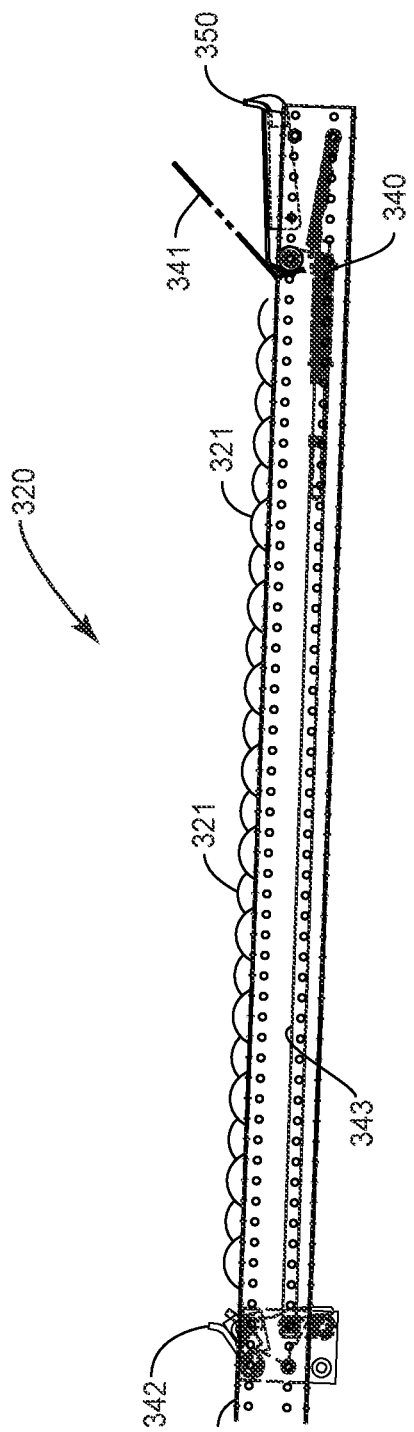
FIG. 4 is an exploded view of a front portion of the pallet storage system of FIG. 2.
Figure 6:
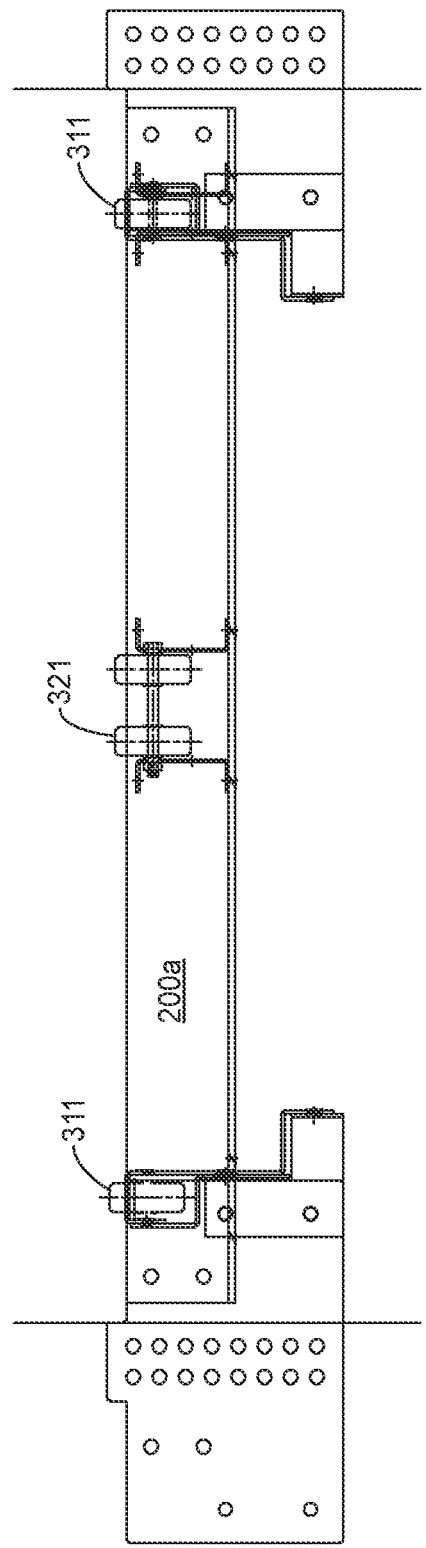
FIG. 6 is a front view of the pallet storage system of FIG. 2.

Active flow section 300 also includes a lower flow section 320. Lower flow section 320 is shown more clearly in FIGS. 4 and 6. Lower flow section 320 includes a plurality of central flow wheels 321. Central flow wheels 321 are positioned substantially inward from rails 210, to address any sag that might occur from wider spacing. There are preferably two rows of central flow wheels 321. They are preferably less than 25" apart, more preferably less than 20" apart, most preferably less than 10" apart.

Lower flow section 320 also includes a plurality of speed controllers 330. Speed controllers 330 are known in the art, and can be of the centripetal force or electromagnetic resistance type. Speed controllers 330 prevent pallets flowing down section 320 from gaining too much speed and momentum. Speed controllers are known in the art and are available, e.g., from Interroll (https://www.interroll.com).

Lower flow section 320 also includes a pallet separator mechanism 340. Pallet separators, which stop the flow of a trailing pallet until a leading pallet is removed from a position directly in front of the trailing pallet, are known in the art. Pallet separators are available, e.g., from Interroll. In one embodiment of the invention, pallet separator 340 includes a forward pedal 341. As a lead pallet travels forward, down section 320, it depresses pedal 341. Pedal 341 is coupled to a pallet separator stop 342 through a linkage 343. Depressing pedal 341 raises stop 342, and prevents any trailing pallets from rolling past stop 342. This reduces the line pressure beyond stop 342.

When the lead pallet is removed, pedal 341 raises, which retracts pallet separator stop 342, and permits the trailing pallet to travel forward, where it will then depress pedal 341, which once again raises stop 342. If two or more pallets are positioned above stop 342, and pedal 341 is released, the front pallet will tend to gain speed before the trailing pallet. This tends to create a gap between the lead and trailing pallets, which permits stop 342 to properly engage and stop the trailing pallet. Front end 200a of system 200 includes a stop lip 350. Stop lip 350 prevents pallets from rolling off of system 200 and retains the pallet at an accessible position at the front of the bay.

Storage system 200 can be used as follows. A pallet transportation cart can load horizontal storage section 250 and active flow section 300 with pallets. Flow section 300 can be two, three, or more pallets deep. It can even be five, eight, or more pallets deep. The front pallet is either picked until it is empty, or it is removed. The front pallet depresses pedal 341. Its removal raises pedal 341, which retracts stop 342, permitting the pallet that had been second, to roll forward, into the first position. It will gain speed before the following pallet, so that when it reaches and depresses pedal 341, stop 342 will engage and stop the following pallet. This will proceed, until all of the pallets in active flow section 300 are removed. At this point, a pallet transportation cart can be used to refill flow section 300.

In another embodiment of the invention, sensors are added along the flow path, such that when the pallets in the pallet flow section have been depleted, the sensors can alert an operator that the lane needs to be "shuffled forward". The operator (or automation) can then place a pallet transportation cart into the lane at the opposite end. A SHUFFLE command on the cart can be implemented. This can automatically "refill" the pallet flow section and move all other pallets forward on the lane. No human labor need be required, other than to initiate the SHUFFLE process.

The pallet cart can travel on an S-shape rail, with the pallet support surface on the top and the pallet cart rail underneath. This rail should be at least 12 gauge thickness (0.1046")—preferred rails are 10 gauge/0.135"

The wheels, when used to provide the low friction surface can be different diameters as will be appreciated by those of skill in the art. In preferred embodiments of the invention, the wheels can be plastic body wheels with steel hub/bearings. Wheel diameter can be at least 2 inches, preferably about 2.88" and width of at least 0.75", preferably about 1" to about 1.4". Other possibilities include steel "skate wheel" wheels, which can be about 1¹⁵⁄₁₆" diameter and about ⅝" wide.

The wheel access slots through the pallet support surface should provide clearance for the wheels. The slots can be about ⅛"-³⁄₁₆" wider than the width of the wheels used, and approximately 2.75" long (large enough for the upper portion of the wheel to protrude through the slot, with about ⅛" clearance between the wheel surface and the edges of the slot.

The wheels should protrude enough to provide smooth flow, but not too high to act as a pallet stop. Wheels should protrude between about ½" and ⅝" above the rail surface. 0.5654" is preferred.

The downward slope of the flow section should promote flow, but not generate too much speed. A slope of about ⁷⁄₁₆" per foot slope on the rails is acceptable for most purposes, but can be varied, depending on expected pallet loads.

The stop lip at the end of the pallet flow section can protrude varying amounts. Acceptable examples include about 1-2 inches, with 1.25" to 1.5" more preferred The speed controllers generally reduce the speed of downward flow to less than 0.3 m/sec. This speed can vary depending on pallet weight, exact pitch, etc. Speed controllers can be magnetic and also can have mechanical type mechanisms.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A warehouse storage system for a plurality of pallets of goods, comprising
   a storage bay extending from a rear end to a front end in a forward direction, the bay having a left side and a right side from the perspective of viewing in a rearward direction from the front end to the rear end of the bay;
   the bay having a rear static storage section and a front active section, the storage section long enough to support at least two 48 inch pallets and having a pair of horizontal support rails extending along the left and right sides of the storage section, spaced apart by a first width, the horizontal support rails having a pallet support surface adapted to support a plurality of pallets of goods, underneath the left and right edges of the pallets, the storage section also having a pair of pallet cart rails under the respective left and right horizontal support rails, the pallet cart rails spaced apart by a second width, and adapted to support the wheels of an automated pallet transportation cart adapted to transport the pallets along the length of the storage section;

the active section located forward with respect to the storage section and inclined downward from a forward end of the storage section, to a forward end of the active section, the active section having a transition zone at the intersection of the storage section and the active section, the active section including a flow section forward from the transition zone;

the transition zone having a pair of left side and right side pallet rails, spaced apart by a third width, and adapted to support at least one pallet of goods, the transition zone also having a pair of left side and right side cart rails adapted to support the wheels of the pallet transportation cart, spaced apart about the spacing width of the pallet cart rails of the storage section, the pallet rails of the transition zone comprising a low friction surface, adapted to permit the at least one pallet of goods to slide forward towards the flow section under the force of gravity, the transition zone configured and adapted to permit the pallet cart to travel thereunder;

the flow section long enough to support at least two 48 inch pallets and having an inclined pallet flow surface, adapted to support at least two pallets of goods and located inward from the pallet rails of the transition zone, the inclined pallet flow surface having a low friction surface adapted to permit the at least one pallet of goods to travel forward towards the front end, under the force of gravity; and a pick section at the front end of the flow section, the pick section arranged to support the pallet in a manner accessible to a warehouse worker.

2. The storage system of claim 1, wherein the flow section comprises at least one pallet stop, constructed and adapted to stop a second pallet trailing a first pallet from traveling forward, until the first pallet is removed from the location directly in front of the second pallet.

3. The storage system of claim 2, wherein the pallet stop comprises a pedal and a tab located rearward of the pedal, and wherein depressing the pedal raises the tab above a surface level of the inclined pallet flow surface of the flow section.

4. The storage system of claim 1, wherein the inclined pallet flow surface of the flow section comprises a left side and a right side spaced apart row of wheels.

5. The storage system of claim 1, wherein the pallet rails of the transition zone comprise a series of slots on the top surface thereof, with respective wheels protruding partially through the slots.

6. The storage system of claim 4, wherein the first width of the horizontal support rails is about 45 inches to 30 inches, and the spacing of the left side and right side row of wheels of the flow section is less than 25 inches.

7. The storage system of claim 6, wherein the spacing of the left side and the right side row of wheels of the flow section is less than 10 inches.

8. The storage system of claim 1, wherein the flow section includes at least one speed controller, adapted to control the speed of a pallet of goods traveling along the flow section.

9. The storage system of claim 1, wherein a pitch of the flow section is at least about 4/16 inches per foot.

10. The storage system of claim 1, wherein the flow system is long enough to support at least four 48 inch pallets.

11. A method of processing a plurality of pallets of goods in a warehouse, comprising:

using an automated pallet cart to load a storage bay with a plurality of pallets of goods, the storage bay extending from a rear end to a front end and having a pair of support rails adapted to support the plurality of pallets of goods and a pair of pallet cart rails adapted to support the automated pallet cart, the storage bay having a rear horizontal static section adapted to store at least two of the pallets of goods and an active section inclined downward and forward with respect to the static section, the active section having a transition zone at the intersection of the storage section and the active section, an inclined flow section forward of the active section, and a pick section arranged to support the pallet in a manner accessible to a warehouse worker and adapted for the removal of the pallets of goods from the storage bay;

moving a first front pallet forward from a front of the inclined active section to a rear end of the pick section, permitting the pallets on the inclined section to slide forward one pallet length only on the inclined section, and stopping a second pallet trailing the first pallet until the first pallet has been removed from the rear end of the pick section and repeating the removal of the front pallet from the inclined active section until all the pallets on the inclined active section have been removed to the pick section, then;

using the pallet cart to reload the inclined section with pallets from the static storage section.

12. The method of claim 11, wherein, the transition zone is downwardly inclined, and the transition zone is loaded with the automated pallet cart, wherein pallets can travel downward from the transition zone by the force of gravity.

13. The method of claim 12, wherein the support rails are spaced apart and have a support surface with a low coefficient of friction, and the pallets in the transition zone are supported at their outer edges by the spaced apart pallet support surface and the low coefficient of friction permits the pallets to travel forward by the force of gravity.

14. The method of claim 13, wherein the pallets in the active inclined section are supported by a central pallet support surface having a low coefficient of friction that permits the pallets to travel forward by the force of gravity, and the central pallet support surface is positioned inward from the spaced apart pallet support surface.

15. The method of claim 14, wherein the support rails have with slots through their upper surfaces, and a wheel extends through each of the respective slots.

16. The method of claim 15, wherein the central pallet support surface comprises a pair of rows of support wheels.

17. The method of claim 11, wherein the active inclined section includes at least one speed controller adapted to control the speed of a pallet traveling down the inclined section.

18. The method of claim 17, including stopping a second pallet trailing a first pallet from traveling forward, until the first pallet is removed from the location directly in front of the second pallet.

19. The method of claim 11, wherein there are at least a first pallet on the active inclined section and a second pallet on the active inclined section, rearward from the first pallet, and after the first pallet is removed from the inclined section, the second pallet travels forward under the force of gravity to take the position of the first pallet.

20. The method of claim 11, including stopping a second pallet on the active inclined section that is trailing a first pallet moving to the pick section from traveling forward to the pick section, until the first pallet is removed from the location of the pick section directly in front of the second pallet.

* * * * *